(12) United States Patent
Grosso et al.

(10) Patent No.: US 8,688,481 B2
(45) Date of Patent: Apr. 1, 2014

(54) SYSTEM AND METHOD FOR PROVIDING GROUP DIVIDENDS

(75) Inventors: Anthony J. Grosso, Suffield, CT (US); Steven P. Rippel, Newington, CT (US); Jacqueline LeSage Krause, West Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 692 days.

(21) Appl. No.: 12/900,657

(22) Filed: Oct. 8, 2010

(65) Prior Publication Data

US 2012/0072240 A1 Mar. 22, 2012

Related U.S. Application Data

(60) Provisional application No. 61/385,014, filed on Sep. 21, 2010.

(51) Int. Cl.
*G06Q 40/00* (2012.01)
*G06Q 40/02* (2012.01)

(52) U.S. Cl.
CPC .................. *G06Q 40/02* (2013.01)
USPC ............ 705/4; 705/2; 705/3; 705/35; 705/38; 705/39; 705/37; 705/44

(58) Field of Classification Search
USPC .................. 705/4, 3, 2, 35, 37, 38, 39, 44
See application file for complete search history.

(56) References Cited

U.S. PATENT DOCUMENTS

| | | | | |
|---|---|---|---|---|
| 4,975,840 | A | * | 12/1990 | DeTore et al. .................... 705/4 |
| 5,613,072 | A | * | 3/1997 | Hammond et al. ............... 705/4 |
| 7,610,210 | B2 | | 10/2009 | Helitzer et al. |
| 7,711,584 | B2 | | 5/2010 | Helitzer et al. |
| 2002/0095317 | A1 | * | 7/2002 | McCabe ........................... 705/4 |
| 2003/0167220 | A1 | * | 9/2003 | Schoen et al. .................. 705/36 |
| 2004/0153362 | A1 | * | 8/2004 | Bauer et al. .................... 705/10 |
| 2005/0055248 | A1 | | 3/2005 | Helitzer et al. |
| 2005/0055249 | A1 | | 3/2005 | Helitzer et al. |
| 2005/0125259 | A1 | * | 6/2005 | Annappindi ..................... 705/4 |
| 2005/0182668 | A1 | | 8/2005 | Debber |
| 2007/0100595 | A1 | | 5/2007 | Earles et al. |
| 2007/0136105 | A1 | | 6/2007 | Huberman et al. |

(Continued)

OTHER PUBLICATIONS

Grameen Bank. Retrieved on Jul. 21, 2011 from <http://en.wikipedia.org/wiki/Grameen_Bank>.

(Continued)

*Primary Examiner* — Tien Nguyen

(74) *Attorney, Agent, or Firm* — Howard IP Law Group, PC

(57) ABSTRACT

Systems and methods for providing dividends to customers are disclosed. The system includes a database for storing data and a business logic processor for determining a dividend to provide to a customer. The stored data includes eligibility criteria for membership in one of a plurality of group dividend plans, data about customers assigned to the plans, and premium payments associated with the customers. The business logic processor receives eligibility data related to a customer's eligibility for assignment to a group dividend plan. The business logic processor uses the received data to identify a dividend group plan that a customer is eligible to join and assigns the customer to the identified plan. Finally, the business logic processor calculates a dividend to provide to the customer based on the assigned plan.

25 Claims, 12 Drawing Sheets

(56) References Cited

U.S. PATENT DOCUMENTS

| | | | |
|---|---|---|---|
| 2008/0065427 A1 | 3/2008 | Helitzer et al. | |
| 2008/0077451 A1 | 3/2008 | Anthony et al. | |
| 2008/0189142 A1* | 8/2008 | Brown et al. | 705/4 |
| 2008/0262877 A1* | 10/2008 | Hargroder | 705/4 |
| 2009/0240535 A1* | 9/2009 | Daughtery, III | 705/4 |
| 2009/0254380 A1* | 10/2009 | Schmidlin et al. | 705/4 |
| 2009/0326987 A1* | 12/2009 | Roudaut | 705/4 |
| 2010/0036684 A1* | 2/2010 | McNamee et al. | 705/4 |
| 2010/0153140 A1 | 6/2010 | Helitzer et al. | |
| 2010/0174566 A1 | 7/2010 | Helitzer et al. | |
| 2010/0241464 A1 | 9/2010 | Amigo et al. | |
| 2010/0241465 A1 | 9/2010 | Amigo et al. | |
| 2011/0022421 A1 | 1/2011 | Brown et al. | |
| 2011/0145023 A1 | 6/2011 | Stahl et al. | |

OTHER PUBLICATIONS

Retrived May 4, 2011 from <https://wfis.wellsfargo.com/ProductServices/A%20to%20Z/FranchiseGroupandAssociationPrograms/Subway/WorkersComp/Pages/default.aspx>.

Despite Downturn, Insurers Explore Smartphone. Retrieved on May 4, 2011 from <http://www.citopbroker.com/your-business/tools/despite-downturn-insurers-explore-smartphone-social-networking-edge-491>.

ITT Hartford's California Participating Programs effective Jan. 1, 1994.

ITT Hartford's Level Dividend Participating Programs effective Jan. 1, 1995.

U.S. Appl. No. 11/789,038, filed Apr. 23, 2007.

* cited by examiner

400

402 — 1. Would you like to participate in a group dividend plan?
404 — Yes ●
406 — No ○

408 — 2. Which of the insurance coverage(s) would you like to participate in as a loss prevention program?

410 — Automobile Coverage ●
412 — Workers Compensation ○
414 — Health Insurance ○
416 — Others ─ 250 ○

418 — 3. Would you like to participate in one of our recommended loss prevention programs?

420 — Yes ●
422 — No ○

424 — 4. Which one(s) of the following recommended loss prevention programs would you like to implement?

426 — Vehicle Monitoring (?)
428 — Employees Training Program (?)
430 — Health Improvement Program (?)
432 — Others (full list) ─ 246

434 — 5. Do you agree to provide telematics monitoring data as part of the loss prevention program? (if applicable)

436 — Yes ●
438 — No ○

440 — 6. Do you agree to provide data demonstrating satisfaction of the loss prevention program requirements?

442 — Yes ●
444 — No ○

FIG. 4

| Criteria Group | Loss Prevention Program Groups 502 ||||  Affinity Groups 504 ||||
|---|---|---|---|---|---|---|---|---|
| | Automobile telematics 506 | Building telematics 508 | Health Monitoring 510 | Safety training 512 | Neighborhood Association 514 | Class of '09 516 | Personal Fitness 518 | Friends 520 |
| 1 (522) | X | | | | | | | |
| 2 (524) | | X | | | | | | |
| 3 (526) | | | X | | | | | |
| 4 (528) | X | X | | | | | | |
| 5 (530) | X | | | X | | | | |
| 6 (532) | | | X | | X | | | |
| 7 (534) | | | | | | | X | X |

FIG. 5

| | Baseline Month 1 | Mon. 2 | Mon. 3 | ... | Mon. 11 |
|---|---|---|---|---|---|
| Managers Training Completed | Yes | No | Yes | | Yes |
| Driver's Education Completed | No | No | Yes | | Yes |
| Monthly Reports Provided | Yes | Yes | Yes | | Yes |
| Delivered Telematics Data | No | Yes | Yes | | Yes |
| Average Driver Safety Score | 20 | 40 | 45 | | 70 |
| Employees Received Feedback | No | No | Yes | | Yes |
| ... | | | | | |
| Improvement Goals Met | No | No | Yes | | Yes |
| Level of Participation | 30% | 50% | 70% | | 95% |

FIG. 7

| Criteria Tiers | Participation Level | Avg. Drivers Score | Loss Ratio(s) |
|---|---|---|---|
| 1 | >75% | >80 | <5% |
| 2 | >65% | >70 | <5% |
| 3 | >50% | >50 | <5% |
| 4 | >50% | >50 | <10% |
| 5 | <50% or n/a | <50 or n/a | <50% or n/a |

SYSTEM AND METHOD FOR PROVIDING GROUP DIVIDENDS

CROSS-REFERENCE TO RELATED APPLICATIONS

This application claims the benefit of U.S. Provisional Application 61/385,014 filed on Sep. 21, 2010, the entirety of which is incorporated herein by reference.

BACKGROUND OF THE INVENTION

Insurance companies currently offer various incentives to encourage a customer to reduce risks covered under an insurance policy. Insurance companies also offer or partner with service providers that offer various kinds of risk reduction or loss prevention programs, services, and/or technology to help customers to reduce risks or to prevent losses. This is because risk reduction and loss prevention is beneficial to both the insurance companies and their customers. One example of the incentives offered is an insurance premium discount, typically determined based on insurance related data including historical insurance data of a customer. Another example of the incentives offered is a dividend offered to customers at the end of an insurance term based on the performance of the dividend group they belong to. For such programs, customers are typically assigned to dividend groups based on the industries to which they belong.

The dividend option differs from premium discounts in important ways. First, the insurance premium discount is typically determined and applied at the beginning of an insurance term, whereas the dividend is determined and applied at the end of an insurance term. Second, discounts are reflective of anticipated loss or risks to be incurred by a customer during the insurance term, whereas dividends are determined based on actual loss savings incurred by the customer. Third, discounts provided to a customer are calculated based on the customer's own risk, whereas a dividend for a customer is determined based on information about a group of customers in the aggregate.

As mentioned above, customers are assigned to dividend groups based on the industry that they belong to and not based on whether or not or how the customers manage their risks or prevent losses. Thus, there exists a need to invite a group of safety oriented entities or individuals seeking to form their own dividend group to share profits derived from their prevented losses. Additionally, to more fairly reward customers who are more safety oriented or proactive at loss prevention, there exists a need for providing dividend plans to customers participating in loss prevention programs. There exists another need for determining an individual dividend using a multi-tier approach so that customers within different tiers of a group are provided with different amounts of dividend. Finally, there exists a need for an automated system for administering such dividend plans.

SUMMARY OF THE INVENTION

Systems and methods are disclosed herein for providing a dividend to an insurance customer by an insurance company in relation to an insurance policy issued by the insurance company. The system includes a database and a business logic processor. The database stores data regarding a plurality of insurance group dividend plans, including, for each plan, eligibility criteria for membership in the plan. The database also includes data about a group of customers assigned to the plan and the premium payments and safety data associated with each of the assigned customers. The safety data may include loss prevention program performance data, including, for example, data related to the output of sensors monitoring property insured under the insurance policy, and/or loss prevention program participation data. The business logic process can receive eligibility data related to a customer's eligibility for assignment to a group dividend plan. The business logic process can identify a dividend group plan that a customer is eligible to join based on the received data and the eligibility criteria stored in the database. The business logic processor can assign the customer to the identified dividend plan and then calculate a dividend to provide to the customer based on the assigned dividend.

In some embodiments, the business logic processor calculates the dividend by determining a dividend percentage to apply to a premium payment associated with the customer. The business logic computer can assign the customer to one of a plurality of tiers within the customer's assigned group dividend plan. The business logic computer can receive the monitored data, or summaries or extracts of such data, as well as other safety data that may be indicative of the performance of the customer in one or more loss prevention programs. The business logic processor can assign the customer to one of the plurality of tiers based on the performance data. The safety data can also indicate the participation level of the customer in one or more loss prevention programs. Accordingly, the business logic computer can assign the customer to the one of a plurality of tiers based on the participation level data.

In other embodiments, the business logic processor can also identify a dividend percentage for the customer based on the tier to which the customer is assigned. The business logic processor can calculate the actual amount of dividend to provide to the customer by multiplying an eligible premium amount associated with the customer by the identified dividend percentage. The business logic processor can determine the dividend percentage based on a loss ratio associated with the group that corresponds to the group dividend plan to which the customer is assigned. The loss ratio is substantially related to claims paid out by an insurance company divided by the premium payment paid by the customer.

For some dividend groups, the eligibility criteria for assignment to the groups may require the customer to participate in a corresponding loss prevention program. For other dividend groups, the eligibility criteria for assignment to the groups may require the customer to implement a telematics system as part of a loss prevention program. For certain dividend groups, the eligibility criteria of the groups require the customer to be a member of an affinity group.

According to another aspect, the invention relates to a computerized method for carrying out the functionality described above. According to another aspect, the invention relates to a non-transitory computer readable medium storing computer executable instructions for causing a computer processor to carry out the functionality described above.

BRIEF DESCRIPTION OF THE FIGURES

The methods and systems may be better understood from the following illustrative description with reference to the following drawings in which:

FIG. 4 is a diagram of a graphical user interface, in this instance, a web page, suitable for obtaining information relevant to assigning a customer to a group dividend plan, according to an illustrative embodiment of the invention;

FIG. 5 is a table illustrating loss prevention program groups and affinity groups to which customers are assigned, according to an illustrative embodiment of the invention;

FIG. 7 illustrates a table of tracking data related to a customer's participation in a loss prevention program, according to an illustrative embodiment of the invention;

FIG. 8 is a table illustrating tiers to which customers participating in an automobile telematics LPP group may be assigned and the criteria associated with each tier, according to an illustrative embodiment of the invention;

DETAILED DESCRIPTION

To provide an overall understanding of the invention, certain illustrative embodiments will now be described, including systems and methods for providing a group dividend plan and for determining an amount of dividend to provide to a customer. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
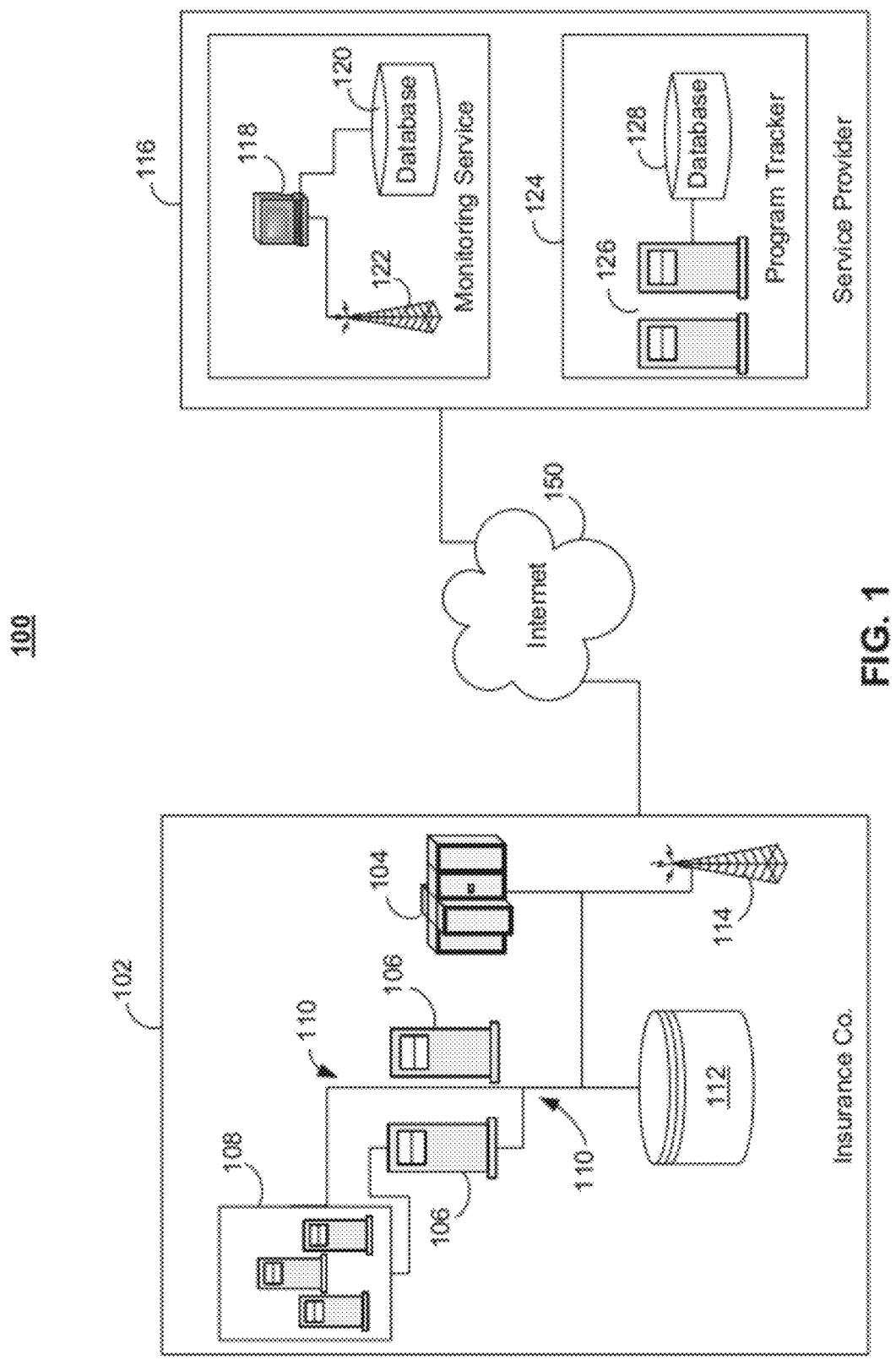
FIG. 1 is a client-server architectural model of a group dividend plan determination system, according to an illustrative embodiment of the invention.

FIG. 1 is a client-server architectural model of a group dividend plan determination system 100, according to an illustrative embodiment of the invention. The system 100 is an automated system for assigning customers of an insurance company to dividend groups based on data stored about the customers and for determining a dividend to provide to each customer at the end of an insurance term. In certain implementations, to be eligible for such a dividend group, customers agree to participate in a loss prevention program, which is designed to help a customer reduce its insured risks. The system 100 as further described below can track, in real-time, each customer's loss prevention program participation and performance during the insurance term. The system 100 can also analyze and depict the performance data of each customer of a dividend group so that customers are aware of their current performance and can determine if their loss prevention practices should be adjusted to achieve desired performance improvements. At the end of an insurance term, the system 100 invokes an appropriate application for determining a term-end dividend to provide to each participant based on the loss ratios and data associated with the participant and with the overall group. A group can include either one or more participants. Groups with only a single participant are especially useful for customers that have policies covering a larger number of properties or a larger number of employees, e.g. fleets of vehicles with multiple drivers.

Architecturally, the system 100 includes an insurance company system 102 and a service provider system 116. The insurance company system 102 and the service provider system 116 can communicate with each other via the internet 150. The insurance company system 102 includes a business logic computer 104, one or more application servers 106, load balancing proxy servers 108, a central database 112, and a receiver 114. Users, such as employees, agents, or customers, can interact with the system 100 via terminals connected to or remote from the insurance company system's data network. The terminals used for the insurance company's employees or agents can be connected to the various servers and computers of the insurance company system 102 via local network 110 or via the internet 150.

The service provider system 116 provides monitoring services to a customer. The service provider system 116 includes a data collection server 118 connected to a database 120 and a sensor data transceiver 122. The provided monitoring service includes an array of existing monitoring services and/or technologies, such as telematics monitoring service, security monitoring service, and the like. The transceiver 122 can receive sensor data directly from monitored property (e.g., vehicle or buildings) or individuals (e.g., vital statistics) and forward the data to the data collection server 118. The data collection server 118 provides the monitored data to the insurance company system 102. Alternatively, or additionally, the transceiver can provide the monitored data directly to the insurance company system 102 by communicating with the receiver 114 wirelessly or via a wired connection, or a combination of both. In another alternative, the data collection server sends the insurance company system 102 a summary, extract, or analysis of the collected data as opposed to providing the raw data. The data can be provided for each individual property being monitored, or it may be aggregated by customer or group.

The service provider system 116 also includes a program tracker system 124. The program tracker system 124 includes a tracking server 126 and a database 128 for storing tracked loss prevention program data including loss prevention program performance and participation data. Various depictions of performance data are illustrated in FIGS. 9-12. It should be noted that any servers mentioned above can be used to host one or more applications including communication applications, business intelligence applications, and/or any insurance related applications. In particular, the servers mentioned above include one or more web servers configured to output data to a web browser or other user interface applications implemented on a user terminal for depicting various progress data of a dividend group and/or progress data of each member in the dividend group. The various embodiments of user interfaces suitable for depicting such data outputted by the web servers are described in relation to FIGS. 4, and 9-11.

In operation, the insurance company system 102 receives data about the customer via the internet 150 or other communication medium. The insurance company system 102 can manage data received from multiple service provider systems according to the standards and protocols of existing content management or content delivery platforms or systems, such as, without limitations, ColdFusion, IBM Lotus Web Content Management, SharePoint Server, or Jadu, or any other open source based systems. The application servers 106 of the insurance company system 102 can also be configured to support various web services through which the service provider system 116 can easily communicate with the insurance company system 102. The data exchange between the insurance company system 102 and other customers can utilize the existing push and pull technologies where the application servers 106 of the insurance company system 102 can act as both a server and client for pushing data to the service provider system 116 and for pulling data from the service provider system 116. The application servers 106 or other servers of the insurance company system 102 can request to receive periodic data feeds of the tracking data. The communication between the receiver 114 and the transceiver 122 of the service provider system 116 can follow various known communication protocols, such as TCP/IP. Alternatively, the receiver 114 and transceiver 122 can communicate with each other wirelessly, e.g., via cellular waves, wifi, or other protocols.

In some embodiments, the business logic computer 104 of the insurance company system 102 executes various applications, algorithms, or statistical or predictive models designed to determine dividend groups and tiers, and to calculate a dividend for a customer. In other embodiments, the business logic computer 104 can invoke the appropriate algorithms or models hosted by various servers, such as the application server 106. As mentioned previously, the insurance company system 102 determines a dividend group that a customer should belong to based on data received about the customer. Data, such as criteria data, about each dividend group and/or the terms and conditions of their corresponding dividend plans, is stored in the central database 112. The central database 112 can also include loss experience data, premium data, and safety data (such as safety performance and program participation data) associated with a group of customers or individual customers. After a number insurance terms during which data about customers participating in a group dividend plan is collected, the business logic computer 104 can fine tune criteria data associated with membership in the various dividend groups and their respective tier definitions by utilizing various machine learning algorithms, such as a Bayesian algorithm.

Figure 2:
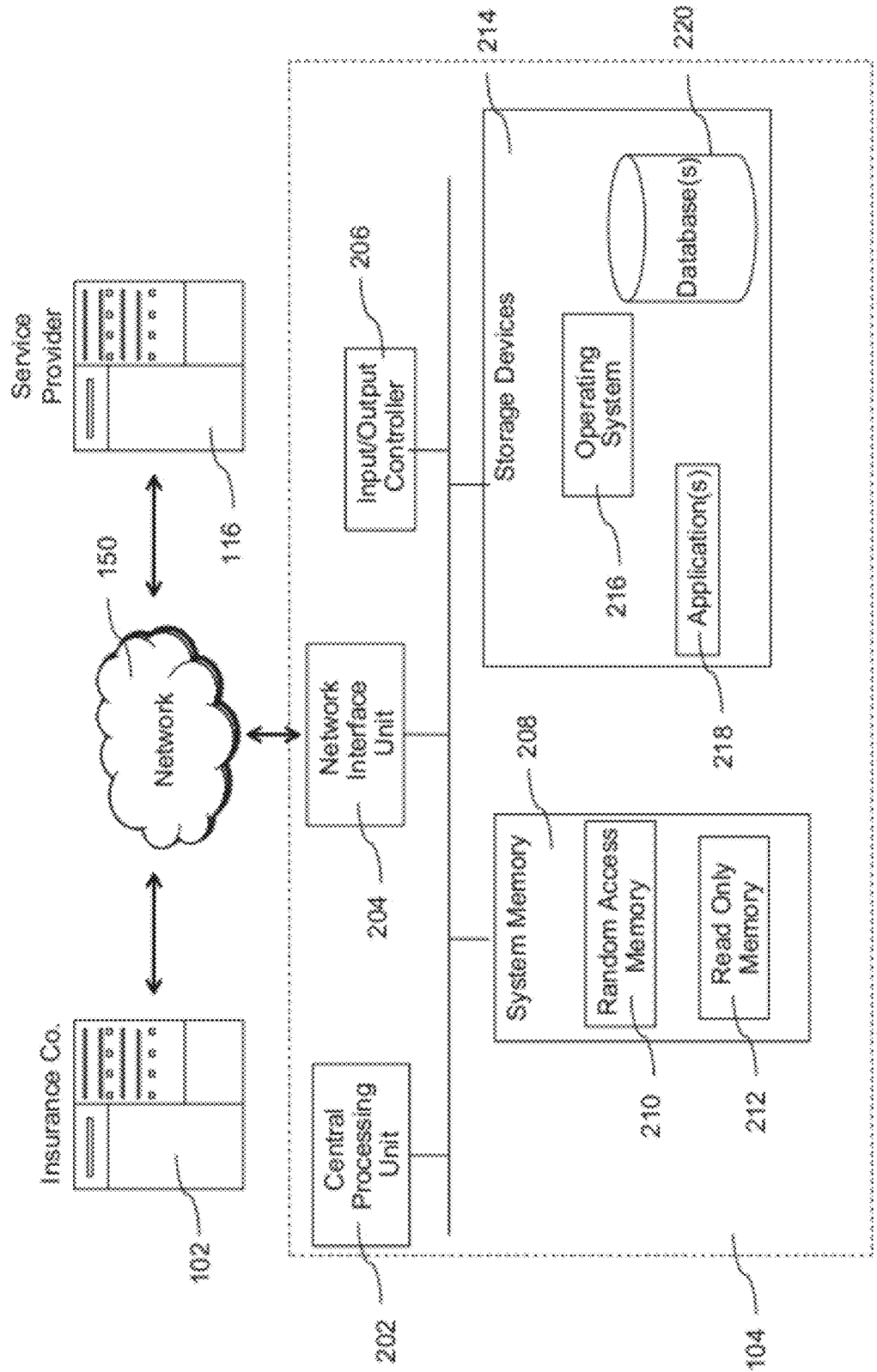
FIG. 2 is a block diagram of a business logic computer used in FIG. 1, according to an illustrative embodiment of the invention.

FIG. 2 is a block diagram of the business logic computer 104 used in FIG. 1 for determining a group dividend plan, according to an illustrative embodiment of the invention. The business logic computer 104 comprises at least one central processing unit (CPU) 202, system memory 208, which includes at least one random access memory (RAM) 210 and at least one read-only memory (ROM) 212, at least one network interface unit 204, an input/output controller 206, and one or more data storage devices 214. All of these latter elements are in communication with the CPU 202 to facilitate the operation of the business logic computer 104. The business logic computer 104 may be configured in many different ways. For example, the business logic computer 104 may be a conventional standalone computer or alternatively, the function of business logic computer 104 may be distributed across multiple computer systems and architectures. In the embodiment shown in FIG. 1, the business logic computer 104 is linked, via network 150 or local network 110 (also described in FIG. 1), to other servers or systems housed by the insurance company system 102, such as the load balancing server 108, and the application servers 106.

The business logic computer 104 may be configured in a distributed architecture, wherein databases and processors are housed in separate units or locations. The business logic computer 104 may also be seen as a server located either on site near the insurance company system 102, or it may be accessed remotely by the insurance company system 102. Some such units perform primary processing functions and contain at a minimum a general controller or a processor 202 and a system memory 208. In such an embodiment, each of these units is attached via the network interface unit 204 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 202 comprises a processor, such as one or more conventional microprocessors and one or more supplementary co-processors such as math co-processors for offloading workload from the CPU 202. The CPU 202 is in communication with the network interface unit 204 and the input/output controller 206, through which the CPU 202 communicates with other devices such as other servers, user terminals, or devices. The network interface unit 204 and/or the input/output controller 206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The data storage device 214 may store, for example, (i) an operating system 216 for the business logic computer 104; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program. In some embodiments, the database(s) 220 includes a database storing an customer's information relevant to determining the LPP group and group dividend plan that the customer is assigned to. The database(s) 220 can further include information about the customer's insurance premium, premium discounts, insurance compliance guidelines for one or more jurisdictions, policy provisions for one or more different types of insurance policies, claims information, and/or prior records of the customer's property and the like.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the processor 202 to perform the process steps described herein, hard-wired circuitry may be used in place of, or in combination with, software instructions for implementation of the processes of the present invention. Thus, embodiments of the present invention are not limited to any specific combination of hardware and software.

Figure 6:
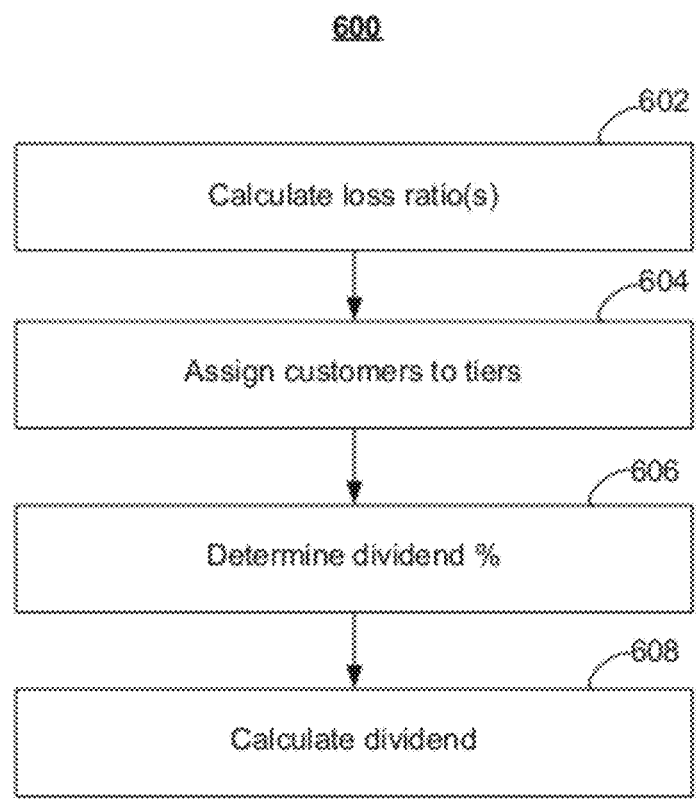
FIG. 6 is a flow chart of a method of determining an amount of dividend to be provided to a customer participating in a group dividend plan, according to an illustrative embodiment of the invention.

Suitable computer program code may be provided for performing numerous functions used to identify or calculate appropriate dividend group assignments, tier assignments, and dividend values as described in relation to FIGS. 5-7. The program also may include program elements such as an operating system, a database management system and "device drivers" that allow the processor to interface with computer peripheral devices (e.g., a video display, a keyboard, a computer mouse, etc.) via the input/output controller 206.

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
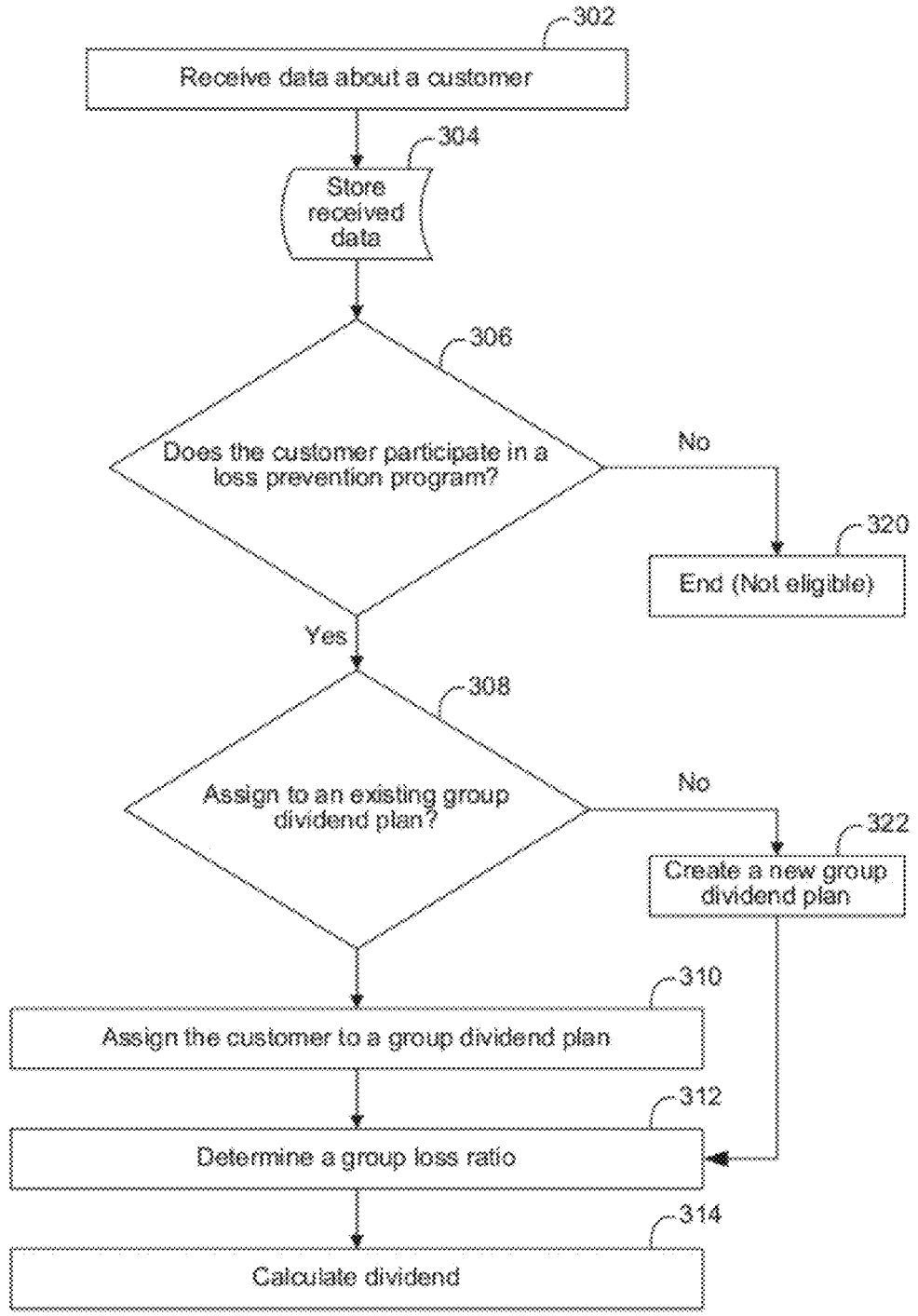
FIG. 3 is a flow chart of a method of assigning a customer to a group dividend plan, according to an illustrative embodiment of the invention.

FIG. 3 is a flow chart of a method 300 of assigning a customer to a group dividend plan according to an illustrative embodiment of the invention. The method begins at step 302 by an insurance company system 102 receiving data about a customer. The customer can be an existing customer or a potential customer. A portion of the received data includes information about a customer's participation or potential participation in one or more loss prevention programs or membership or potential membership in an affinity group. In some embodiments, the insurance company system 102 receives data directly by providing a web application or tool to allow the customer or the customer's insurance agent to provide the data. Alternatively, or additionally, the insurance company system 102 receives the data from a service provider system that provides telematics monitoring services, safety training programs, employee training programs, or the like to the customer. In some instances, the insurance company system 102 can receive such data from data aggregators. For existing customers, the insurance company system 102 may already store data about whether the customer is eligible for a particular group dividend plan. In such cases, the insurance company system 102 identifies and requests any additional information about the customer needed to make a determination. After receiving the data, the insurance company system 102 stores the received data in a database 304.

After storing the received data, the insurance company system 102 analyzes the data to determine whether the customer participates in a loss prevention program at step 306. To do so, the insurance company system 102 accesses the database 112 to determine if the stored data of a customer contains information sufficient to determine or verify the customer's participation. In one embodiment, if the customer participates in a loss prevention program, the insurance company system 102 stores in the database 112 an indicator to indicate that the customer is eligible for a group dividend plan. If the participation information is not readily available, the insurance company can indirectly infer such information from aggregated data about the customer by applying linguistic analytics or text mining algorithms to data stored in the database 112. An example of a system for inferring information or knowledge from a knowledge base is an inference engine. An inference engine is particularly useful for computation-intensive applications, e.g., when the aggregated data is large in volume, and periodic re-evaluation of data is desired. To verify the inferred information, the insurance prompts a customer with a list of questions, such as the questions illustrated in FIG. 2. If the insurance company system 102 is still unable to determine or verify the customer's participation in the program, the insurance company system 102 can deliver a message or notification to the customer to request proof of participation. It should be noted that a customer can participate in multiple loss prevention programs aimed to reduce risks covered under multiple insurance coverages of an insurance policy. For example, a construction or real estate development company may participate in both a telematics monitoring program and employee training programs to prevent losses associated with its auto insurance and workers compensation insurance, respectively.

In one embodiment, if the insurance company system 102 determines that the customer does not participate in a loss prevention program, the insurance company system 102 ends the determination process at step 320 as the customer is not eligible for a group dividend plan. Once this occurs, the insurance company system 102 delivers a message or notification to the customer seeking participation in a group dividend plan. The delivered message or notification may indicate to the customer the denial of the request and/or detailed information as to why the customer's request to participate in the plan was denied. Such messages or notification can be delivered via a web page, e-mail, fax or postal mail. If the notification is provided by webpage or email, the notification can also include URL links to the various loss prevention programs that the insurance company system 102 and/or service provider systems are offering. This way, the customer is given the opportunity to participate in a loss prevention program to become eligible for the group dividend plan option.

Alternatively, participation in a loss prevention program is not required to be eligible for group dividend. Some individuals may wish to form their own dividend group or request a customized dividend group plan, the insurance company system 102 can create a new group dividend plan for the individuals at step 322. For example, the insurance company system 102 can offer an affinity group dividend plan related to personal lines insurance to these individuals, because they are related to each other in some way, e.g., they graduated from the same high school the same year, are friends, live in proximity to each other, or have certain common interests or similar demographics, etc.

Through such an offering, an insurance company can leverage peer pressure to enforce or encourage participants in complying with their loss prevention practices or improving their safety performance to try to reach their loss prevention objectives or targets. For example, in one embodiment, the insurance company may host a school driving safety competition among high schools or colleges. Students at each school are grouped into a dividend group with their class mates, and each high school may be assigned its own loss prevention targets or goals. At the end of the school year, dividends are determined for each student based on a comparison between their schools' performance relative to other schools. The school demonstrating the highest safety performance or the highest loss prevention program participation may be granted the highest dividend and/or some other reward, such a donation to the school or a charity in the name of the school.

During the insurance term, loss prevention participation or performance results of all the schools are tracked and compared to one another. Participants can electronically access their tracking data as well as others' tracking data (e.g., their class mates and/or aggregate tracking data from other competing schools) during the term. For example, tracking data can be pushed to mobile devices, e.g., via a proprietary application downloaded to a smart phone, through which an individual can access tracking data on the go. An illustrative example of a user interface implemented on a mobile device for depicting tracked compliance data of dividend groups is described in relation to FIG. 11 In other embodiments, tracking data can be depicted using an on-line, web-based progress tracker to indicate various performance or participation levels achieved, as described in relation to FIGS. 9-11. If a safety score can be calculated or determined for a given loss prevention program, the progress tracker can indicate the present score of each dividend group or school. The insurance company can additionally plot each school's performance on a graph and such a graph can be updated periodically or every time a participant requests to access such information. The insurance company can also additionally plot each student's performance on a graph and such a graph can be updated periodically or every time another student requests to access such information. Providing peer information encourages participants to perform to a higher standard and to urge their peers to improve their performance, too.

Such a peer-to-peer encouragement model can be realized through the use of various kinds of technology. For example, the insurance company can allow each participant to share their on-going performance results with others using a social media service, such as FACEBOOK. While the example provided above is related specifically to an interscholastic competition, such peer to peer encouragement may be useful in any dividend group, though it has particular benefits in dividend groups arranged by participant affinity.

After determining that the customer participates in a loss prevention program, the insurance company proceeds to determine if the customer should be assigned to an existing group dividend plan at step 308. Each dividend plan has certain terms and conditions as specified by the insurance company. The terms and conditions include information about the eligibility criteria of the plan, or the group associated with the plan, and/or information about tiers that customers of a plan can be assigned to. For customers that do not request a customized dividend plan, such as most customers who are organizations, companies, or institutions seeking to insure their employees and properties, or assets, the insurance company assigns these customers to an existing group dividend plan at step 310. Assigning a plan is a two-step process. First, the insurance company identifies a dividend group to which customers are to be assigned, as described in relation to FIG. 5. Second, the insurance company assigns customers to dividend plans based on the dividend groups that the customers are assigned to. The assignment of customers to groups is determined based on the data received about the customer. Dividend groups generally fall into two categories: groups requiring participation in certain loss prevention programs (referred to as "LPP groups") and groups requiring membership in an affinity group (referred to as "affinity groups"). Other groups may require both participation in certain loss prevention programs and membership in an affinity group. Each group may be further broken down into tiers, e.g., based on participation rates or actual program performance data. Each dividend group has eligibility criteria associated with it, examples of which are illustrated in FIG. 5. Assigning customers to plans, or groups, allows the customers with similar risks, risk reduction practices, or dedication to receive their fair shares of a group dividend calculated based on the overall risk reduction and/or performance achieved by customers belonging to the same dividend group, or plan. The plan defines the terms and conditions for membership in the group, tier criteria, as well as dividend allocation guidelines for the group.

At step 312, the insurance company determines a loss ratio for the dividend group that the customer is assigned to. The loss ratio is an indicator of how much profit an insurance company earns from a customer or, in this case, all the customers belonging to the same dividend group during an insurance term. It is calculated, in some instances, as the ratio between the amount of claims paid out by the insurance company for the customers and insurance premiums paid to the insurance company by the customers, during the same insurance term for a particular insurance coverage. In one embodiment, the insurance premiums used in the loss ratio calculations are limited to a portion of the total premium paid. This portion is referred to as the eligible premium. In some embodiments, the eligible premium dose not take into account premium discounts or allowances awarded to the customer. In some embodiments, an eligible premium is a fixed percentage of the actual premium paid by a customer. The calculation of loss ratios can be made according to various existing known methods or algorithms and occurs at the end of an insurance term, which is typically a year long in length. However, shorter insurance terms can be used without departing from the scope of the invention.

During an insurance term, the insurance company can also calculate loss ratios of a group or an individual customer on a periodic basis, such as every quarter, or every six months, etc. In such implementations, the insurance company may inform the customers of the determined loss ratios on a periodic basis. Customers can use the loss ratio information to periodically adjust its current loss prevention practices based on identified areas of weaknesses.

At step 314, the insurance company determines the dividend to be provided to each customer assigned to a group dividend plan based on the loss ratio of the entire group of customers and/or the tiers the customers are assigned to. The details of the dividend determination process are described in relation to FIG. 6. In one embodiment, the amount of dividend to be provided to each customer is based on the group dividend percentage of the entire group of customers belonging to the same dividend group, which is indicative of the overall performance achieved by the group. In some embodiments, individual dividend percentage is determined based on the tier that the customer is assigned to, which is determined at the end of the insurance term. The insurance company can pay out the dividend in several ways. In some embodiments, the dividend is credited to the customers' account. The customers can apply the credit to a future premium. In some embodiments, the credit can only be applied to insurance-company provided services. The details of an illustrative suitable system and method for administering such payments are further described in co-pending U.S. patent application Ser. No. 12/254,215, the entirety of which is incorporated herein by reference.

FIG. 4 is a diagram of a graphical user interface, in this instance, a web page 400, suitable for obtaining relevant information about a customer seeking to participate in a group dividend plan, according to an illustrative embodiment of the invention. The web page 400 includes a series of questions, the answers to which are used by a business logic computer of the insurance company for identifying a group dividend plan, or group, to which a customer is assigned and for determining an amount of dividend to provide at the end of an insurance term (steps 306-314). Each customer can receive a web account through which the customer or the customer's agent can provide the relevant information. Alternatively, or additionally, answers to some of the listed questions are automatically populated by a business logic computer 104 of the insurance company system 102 if the relevant data already exists in the insurance company's database 112. In other embodiments, a service provider system can also provide answers to some of the listed questions.

In question 402 of web page 400, the customer is asked if it would like to participate in a group dividend plan. The customer can select one of two options, 404 or 406, by clicking on their respective radio buttons. After selecting option 404, "Yes", the customer is asked in question 408 to identify the insurance coverage(s) for which it would like to participate in a loss prevention program. An insurance company typically creates for a customer an insurance policy containing multiple insurance coverages. For example, a business seeking comprehensive insurance to cover its employees, property, activities, etc., may request workers compensation coverage, employee health coverage, automobile coverage, group disability coverage, and general liability coverage. Individuals may obtain property insurance auto insurance, life insurance, as well as other forms of personal lines insurance. A customer can implement or participate in multiple loss prevention programs, each of which is designed to reduce or prevent loss associated with each risk of an insurance coverage. Options 410, 412, 414, and 416 allow the customer to select multiple loss prevention programs targeted to reduce risks or prevent losses covered under multiple insurance coverages of an insurance policy. A customer can choose a particular insurance coverage for which it seeks to participate in a loss prevention program by clicking on the radio button placed under each answer option. It should be noted that selection of one radio button is not mutually exclusive of selection of the other. Participation in multiple loss prevention programs can be used by the business logic computer 104 of the insurance company system 102 to determine which dividend group the customer should belong.

If the customer selects option 416, "others," the customer can enter the name of the insurance coverage or policy number into the input field 450. The insurance company can use the policy number to retrieve information about the customer and its coverage from the insurance company's database. Alternatively, or additionally, a link is embedded in the radio button of option 416 so that when the customer clicks on the radio button under option 416, the customer is provided with a listing of all qualifying insurance coverages that the insurance company offers for which loss prevention programs and/or dividend plans are available. In some other embodiments, the URL link is embedded in the text, "others", of option 416.

In question 418, the customer is asked if he/she would like to participate in a recommended loss prevention program. If the customer selects option 420, "Yes," the customer is presented with question 424. Otherwise, the customer is provided with a list of additional programs, services, or systems offered by the insurance company or a third party service provider. If the customer wants to create and implement its own loss prevention program(s), the customer can submit information about its loss prevention program(s). The insurance company can route the customer to a different web page on which the customer can enter data or information relevant to the customer's loss prevention program(s).

If the customer selects option 420, "YES," to participating in a recommended loss prevention program, the customer is asked to specify or select which one of the existing recommended programs the customer wishes to participate in. Some illustrative options include vehicle monitoring program 426, employee training program 428, and health improvement program 430, or the use of cognitive improvement programs or tools. The customer can access an entire list of recommended programs using link 446 next to option 432, "others." Each recommended loss prevention program option also has its associated link through which the customer can access additional information or a description about a recommended program. The link may be in the form of a question mark, as illustrated on web page 400. Alternatively, a link can be embedded in the text or radio buttons associated with options 426, 428, 430, and 432.

As the customer progressively completes the various questions contained on web page 400, the business logic computer 104 or a server can track the received data and update the database accordingly. If the customer selects vehicle monitoring at option 426, the insurance company requests permission to receive telematics monitoring data in question 434. If the customer selects option 436, "Yes," the insurance company system 102 will then establish communication with a telematics service provider system 116 to request additional information or data to allow the insurance company system 102 to periodically receive sensor data about the customer. For an example, the insurance company can automatically receive data about each driver's driving behavior for a day, a month, or a longer period from a service provider that is providing the telematics monitoring services. The insurance company system 102 uses data indicative of driving performance to determine the tiers to which the customers should be assigned at the end of the insurance term. If the customer selects option 438, "No," the insurance company system 102 will not receive any telematics sensor data about the customer and the determination of tiers for such a customer will, therefore, not be based on telematics sensor data. After the customer selects "No", the insurance company system 102 can prompt the customer with a message indicating that, by not providing telematics monitoring data, the customer may be assigned to a dividend plan designed for higher-risk customers.

Finally, the insurance company system 102 further requests the customer to provide data demonstrating satisfaction of loss prevention program requirements in question 440. If the customer selects "Yes," option 442, the insurance company system 102 will track the customer's performance and will use the tracked data to identify a tier to which the customer will be assigned at the end of the insurance term. As mentioned above, the tier to which a customer is assigned is used by the insurance company system 102 to determine, at least in part, a dividend percentage, or the dividend, to provide to the customer at the end of the insurance term. Thus, customers are encouraged to achieve high performance so they will be assigned to a tier with a high dividend percentage. If the customer selects "No," option 444, the customer may only be qualified for a limited amount of dividend or none. The insurance company system 102 can also inform or notify the customer of such information.

In some embodiments, the customer may be provided with the option to change its previous answer to questions 434 and 440 after receiving the notification that their elections may result in a lower dividend.

FIG. 5 is a table illustrating loss prevention program groups and affinity groups to which customers are assigned, according to an illustrative embodiment of the invention. Each group is listed the left-most column of the table. The various criteria that might apply to the groups is set forth in the remaining columns. An "x" in a column related to a loss prevention program indicates that membership in that group requires participation in that loss prevention program. An "x" in a column related to an affinity group indicates that membership in that group requires membership in the affinity group.

More particularly, table 500 includes illustrative groups 1-7 and their associated criteria. For example, if the received data about a customer indicates that the customer implements or will implement an automobile telematics system as part of the loss prevention program, the insurance company system 102 determines that the customer satisfies the criteria associated with group 1. Accordingly, the insurance company system 102 assigns the customer to group 1. Similarly, if received data about a customer indicates that the customer will implement a building telematics system to monitor the insured building, the insurance company system 102 assigns the customer to group 2. As shown in FIG. 5, some groups have criteria that are the combination of criteria associated with multiple groups. Customers satisfying criteria associated with the multiple groups are assigned to a single group, such as groups 4, 5, or 7. For example, Group 4 requires a customer to implement both an automobile telematics system and a building telematics system, which are criteria required by groups 1 and 2. Accordingly, the customer is assigned to Group 4. As another example, customers who implement both an automobile telematics system and safety training as part of the loss prevention program are assigned to group 5, as Group 5. There are also dividend groups with criteria that are a combination of criteria associated with both an LPP group and an affinity group. As an illustrative example, customers who are friends and agree to participate in a personal fitness program and to implement health monitoring as part of their loss prevention programs are assigned to group 7. In an alternative embodiment, if a customer qualifies for membership in multiple groups, the customer may be provided additional information about the plan associated with each group they qualify for and is given the ability to select which group they are assigned to.

In some embodiments, a customer may participate in multiple dividend groups. Their dividend can be determined, based on the performance of each of the dividend groups. For example, the premium paid by the customer may be split among the dividend groups for dividend calculation purposes. The dividend for each group is then determined independently for its respective premium portion. Alternatively, the insurance company system 102 may calculate a combined dividend.

The criteria are stored as rules in a database accessible by the business logic computer 104 of the insurance company system 102 so that when data about a customer is received, the received data can be compared with the rules to quickly identify which group the customer should be assigned to. It should be noted that information contained in table 500 is illustrative only and is stored in the database 112. The insurance company system 102 can obtain and use a variety of data pertinent to the determination of dividend groups. Such data can be obtained via web page 400 or other communication medium or data collection means.

FIG. 6 is a flow chart of a method 600 of determining an amount of dividend to be provided to a customer participating in a group dividend plan, according to an illustrative embodiment of the invention. The business logic computer 106, or application servers 106 of the insurance company system 102, begins the method at step 602 by calculating the loss ratio of the entire dividend group and/or the loss ratios of all the customers belonging to the group. In one embodiment the business logic computer 106 uses the loss ratio of the entire group to determine a dividend percentage for each member of the group. In another embodiment, the business logic computer 104 calculates individual loss ratios of customers and uses the individual loss ratios to determine the tiers to which customers of a dividend group will be assigned. Each tier is then assigned a different dividend percentage for use in calculating dividends for customers in that tier, either based on the group-wide loss ratio or a separately calculated tier-wide loss ratio.

The loss ratios are calculated according to various mathematical formulas. As a simple example, the loss ratio may equal the ratio between the amount of claims paid out by the insurance company and the eligible premiums paid by the customers.

At step 604, the business logic computer 104 assigns customers to tiers. The tier assignment may be based on individual customer loss-ratios as described above or based on each customer's tracking data indicative of customers' safety performance and loss prevention efforts. In some cases, information about safety scores, such as driving scores, is determined by the telematics system. An illustrative suitable system for determining driver scores based on vehicle monitoring data is described in co-pending U.S. patent application Ser. No. 12/181,463, the entirety of which is incorporated herein by reference. The business logic computer 104 can utilize such scores and/or any other data collected from a telematics system when assigning customers to tiers. In this latter case, to be assigned to a tier, the tracking data maintained for a customer needs to satisfy the criteria, or rules, associated with the tier. Illustrative tiers and their criteria are described further in relation to FIG. 6B. Additionally, or alternatively, the business logic computer 104 determines tiers and assignment to tiers based on data or various factors used to determine the dividend group to which customers of the dividend group are assigned. For example, for dividend groups assigned based purely on affinity group membership, tiers may be assigned based on participation in certain loss prevention programs, in conjunction with, or regardless of, participation or performance levels.

At step 606, the business logic computer 104 determines a dividend percentage associated with a customer. In one embodiment, the business logic computer 104 calculates the dividend percentage of each customer by adding or subtracting an offset from a base group dividend percentage. For example, in a 3-tier dividend group, customers assigned to a higher tier are given the base group dividend percentage plus an offset, in the range, for example of 1-3%. Customers in the middle tier may be given the base group dividend percentage. Customers assigned to a lower tier are given the base group dividend percentage minus the offset.

A dividend percentage is determined at least partially based on a loss ratio. The business logic computer 104 can invoke an algorithm or program used to determine a dividend percentage based on a loss ratio. Alternatively, or additionally, the insurance company can access a database that stores a look-up table listing the loss ratios, or ranges of loss ratios, and their associated dividend percentages, or ranges. For example, for a 5% loss ratio of a dividend group, the corresponding base dividend percentage may be 30%. As another example, for a 10% loss ratio, the dividend percentage may be 20%. In general, the lower a customer's, group's, or tier's loss ratio is, the higher the dividend percentage and, therefore, the higher the amount of dividend will be.

In an alternative embodiment, the business logic computer 104 determines a tier dividend percentage independently for each tier within a dividend group and provides the tier dividend percentage to all customers assigned to the tier. The tier dividend percentage may be determined based on the aggregate loss ratio the each customer assigned to the tier.

At step 608, the business logic computer 104 calculates the amount of dividend for each customer. The amount is determined by multiplying the dividend percentage as determined at step 606 with the amount of eligible premium paid by the customer. For example, assuming the dividend percentage for a customer is 20%, as determined based on the group dividend percentage and the tier that the customer belongs to, and the amount of eligible premiums that the customer paid to the insurance company is $20,000, the customer will be given 20% of the $20,000, or $4,000, as a dividend.

FIG. 7 illustrates a table 700 of tracking data storing a customer's participation in a loss prevention program, according to an illustrative embodiment of the invention. As noted earlier, the group to which a customer belongs may be determined in part based on satisfaction of group criteria associated with each dividend group at the beginning of an insurance term. In certain embodiments in which tier assignments are based on actual customer safety performance or loss prevention program participation rates, to determine which tier a customer should be assigned to at the end of the insurance term, the insurance company needs to track the customer's participation levels and/or safety performance. The data can be tracked and stored periodically. Alternatively, or additionally, the summary of tracking data is provided to the insurance company at the end of the insurance term. The tracking data can include sensor data (or summaries, abstracts, or analyses of such sensor data) as collected by one or more service providers or the insurance company, or the combination of the two. It should be noted that the service providers and/or the insurance company can provide the recommended loss prevention programs, as described in relation to FIG. 1, and, thus, both parties can collaboratively track data about the customer's participation in the program(s).

The table 700 illustrates tracking data for each month, such as column 702 for Baseline Month 1, column 704 for Month 2, column 706 for Month 3, and column 708 for Month 12. For each month, a variety of information about the customer's program participation progress is tracked. A report including the tracked data can be generated by various known business intelligence application systems, such as Crystal Reports, configured to allow insurance personnel to design and generate reports from a wide range of data sources. Crystal Reports, or the like, can typically access a variety of databases such as IBM DB2, Microsoft Access, Microsoft SQL Server, MySQL, Oracle, Postgre SQL, Interbase, and so on.

The tracking data in the report can include information about whether managers overseeing the participating employees have completed requisite safety training classes. In one embodiment, safety training class may be completed online, allowing participation data for the class to be easily transmitted to the insurance company via the internet 150. Training classes may also be offered in a live classroom setting. In such situations, participation data can be uploaded to or submitted via a web page to the insurance company, or via other communication media. Similarly, in the case of a loss prevention program designed to improve driving safety, tracking data can include information about whether the drivers have completed their online or in-class drivers' education. For some loss prevention programs, the business logic computer 104 of the insurance company can send a monthly report reflecting feedback on a participant's safety performance or driver education participation levels to the driver and/or the driver's manager, etc. The generation of reports can also be done by the service provider that is offering the loss prevention program. If the insurance company is providing the loss prevention program, the business logic computer 104 of the insurance company can automatically output a progress or summary report to each driver on a monthly or other regular basis. In addition, interim reports may be provided immediately upon detection of significant safety concerns or participation rate deficiencies or drop-offs.

Using the automobile safety program as an example, the tracking data can also include information as to whether the telematics data is delivered to the insurance company 402 for a particular month. Depending on the particular content management system used, some telematics systems require a system administrator to release or push data from the customer's server or terminal to the insurance company's server, or business logic computer 104. For a system that has automatic delivery, the business logic computer of the insurance company may still verify the receipt of such data on a regular basis in case of any delivery failure or errors.

In some cases, the safety training class or a portion of which can be completed using a mobile device. The insurance company and/or a service provider can provide a mobile device application of the safety training class. The application can track and store the training class results or progress locally in the mobile device or remotely in a cellular service provider's database. The stored data can then be delivered to the insurance company via a wired or wireless network.

Some loss prevention programs calculate a safety score indicative of the driver's overall safety level for each customer on a regular basis, such as every month. Thus, tracking data can include information about the average driver safety score, or other statistical measures related to the score, e.g., the standard deviation. The average safety score and/or standard deviation of safety scores of the customer can be used, alone or in combination with other parameters, to determine a tier for the customer, as explained in relation to FIG. 8. The customer can use information about each individual employee, such the employee's driving score, to reward employees who have made the most improvement or achieved the highest safety score, fostering an environment where every employee is encouraged to be more safety conscious.

In certain embodiments, customers of the same dividend group can review each other's safety scores or summary reports to encourage each other to reduce risks or prevent losses. The group dividend plan structure promotes such collaborative safety improvement efforts because the overall performance of the entire group will determine, at least partially, the amount of dividend each participating customer will receive at the end of the insurance term.

The customer, the insurance company system 102, and/or a service provider system 116 uses the tracking data to help the customer to adjust current loss prevention practices to target areas of weakness. As another example, the tracking data also can include information about whether employees have actually received the monthly reports of their safety improvement progress. This is important because periodic self-assessment is key to identifying areas of weakness that require further improvement.

The service provider system 116 or the business logic computer 104 of the insurance company system 102 can determine if improvement goals set by the managers or trainers responsible for training the employees are met. The business logic computer 104 can track data about the actual level of participation, or the actual percentage of employees that participated in the loss prevention program, for every month. The actual percentage of participation for a month can later be used to determine an overall participation level of the customer for the entire insurance term, which may be used in assignment of a tier. Customers with a lower participation level, e.g., a low participation percentage, are assigned to a lower tier and are given a less dividend than customers with higher participation level.

FIG. 8 is a table 802 illustrating tiers to which customers participating in the automobile telematics LPP group may be assigned and the criteria associated with each tier, according to an illustrative embodiment of the invention. Each tier has its associated criteria set out besides it in a row of the table 800. In this illustrative example, the criteria include participation level, the average drivers score, and the loss ratio(s) ranges. Customers whose tracked data indicates the satisfactions of criteria associated with multiple tiers are assigned to highest tier (the lowest number in the table) they qualify for.

The business logic computer 104 or application servers 106 of the insurance company system 102 are configured to use tracked compliance or performance data about each customer and/or each dividend group to determine their appropriate tier. In this illustrative embodiment, customers who had less than 50% of their employees participate in the loss prevention program, whose average driver score is less than 50, or whose loss ratio is less than 50% are assigned to the bottom tier, tier 5. These customers are given the least amount of dividend percentage as compared to dividend percentages to be provided to customers assigned to tiers 1-4. In some embodiments, they may not qualify for any dividend at all. Alternatively, or additionally, customers with tracked data that does not include information about the participation level or an average driver's score are also assigned to tier 5. To be assigned to tier 4, customers need to have a participation level over 50%, an average driver's score over 80 and a loss ratio less than 10%. To be assigned to tier 3, customers need to have a participation level above 50%, an average drivers score greater than 50, and a loss ratio less than 5%. To be assigned to tier 2, customers need to have a participation level above 65%, an average drivers score greater than 70, and a loss ratio less than 5%. To be assigned to tier 1, customers need to have a participation level above 75%, an average drivers score greater than 80, and a loss ratio less than 5%. It should be noted that the tiers and their criteria are illustrative only. Other metrics, or criteria, can be used to create more granular tiers.

Figure 9:
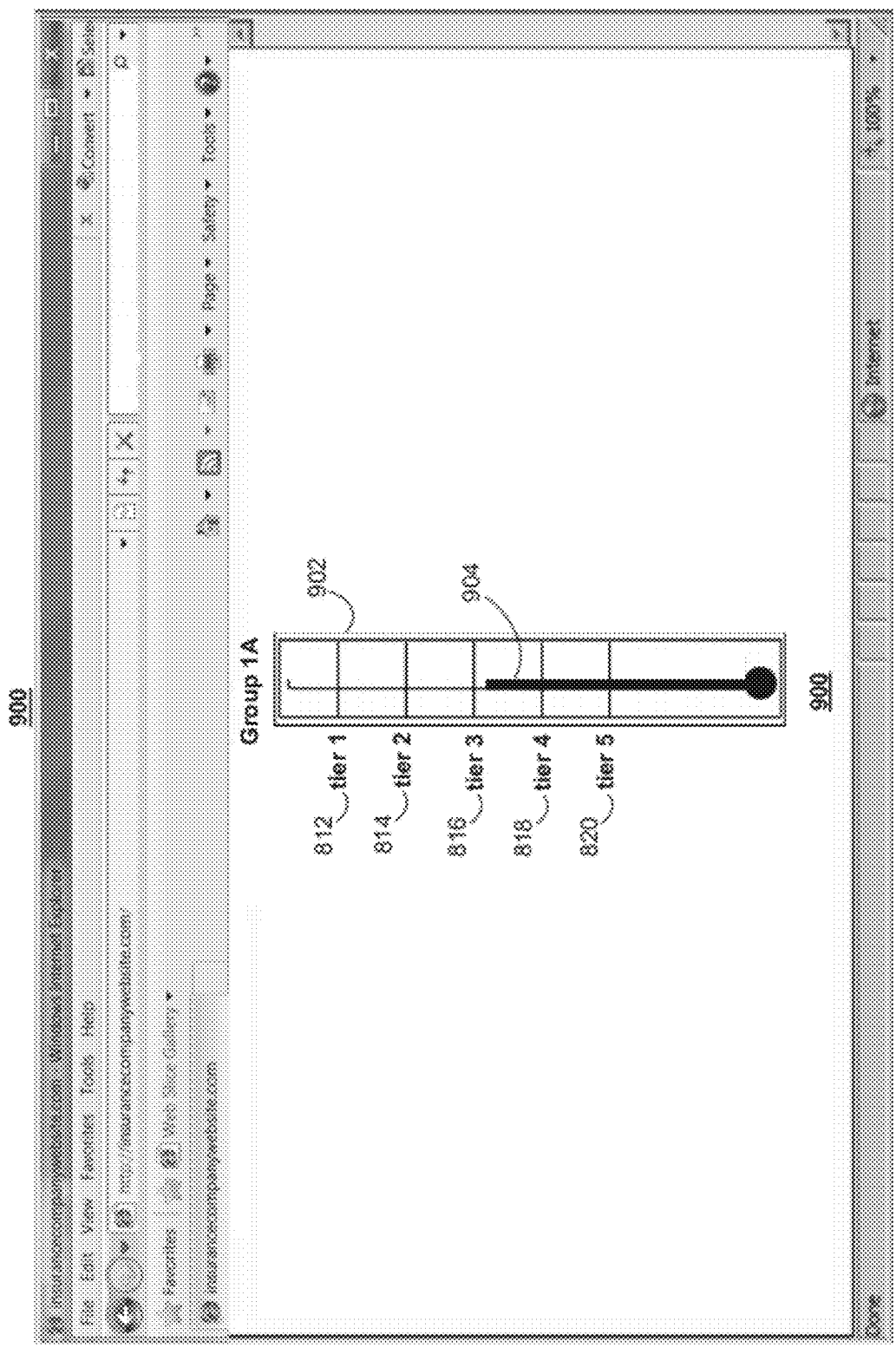
FIG. 9 is a diagram of a graphical user interface for displaying a participant's current loss prevention performance data and the tier to which the participant is assigned, according to an illustrative embodiment of the invention.

FIGS. 9-12 depict various interactive graphical user interfaces configured to allow dividend group participants to view their performance scores and/or progress and to encourage and/or compete with one another to improve their performances. FIG. 9 depicts one such an interface, in this instance, a web page 900, for displaying a participant's current loss prevention performance data and the tier to which the participant is assigned, according to an illustrative embodiment of the invention. As described above, participants of group dividend plans are assigned to tiers at the end of an insurance term. However, while a participant is participating in a dividend plan, the system 102 determines, in real-time, the tier that the participant is qualified for based on his/her current tracked performance, or compliance, data. As described in relation to FIGS. 1 and 4, the insurance company system 102 includes servers, such as a web server, that are capable of generating and delivering source code associated with various web pages, such as the web page 900, to a user terminal's web browser. A web browser implemented on a user's terminal can receive the source code via various well known protocols, such as http, and render the graphics and provide various web related features according to functions or programs as specified in the source code.

In this illustrative embodiment, after a user logs into his/her account with the insurance company, a performance tracker graphic 902 (hereinafter "performance tracker") is depicted on the web page 900. The performance tracker 902 includes a progress bar 904, the position of which within the performance tracker 902 in relation to the various tiers as labeled is indicative of a participant's assigned tier and loss prevention program progress. For example, in this instance, the participant is assigned to tier 4 based on his/her current performance data.

In some embodiments, the performance tracker 902 is interactive. A user can interact with the tracker 902 via various well-known input devices, such as a mouse, a trackball, a touch screen, a keyboard, and the like. For example, a participant can mouse over or click anywhere on the progress bar 904 via a mouse to access additional details about his/her current performance. Additional details may include a detailed break-down of the performance data used in determining the assigned tier, various criteria associated with each tier, e.g., see FIG. 8, suggestions for future improvements as determined based on the current performance data, performance data comparison between the participant's data and data of other members of the same dividend group, performance data comparison between the participant's data and the average performance data of the entire group, e.g., FIGS. 10 and 11, and/or any other meaningful depictions capable of characterizing the relative and/or absolute performance of a participant and/or of a dividend group.

In some embodiments, in response to receiving a user request for additional details about his/her performance data, the system 102 retrieves tracked data about the participant from the database 112. The business logic computer 104 analyzes the retrieved tracking data to determine areas of weakness, which can be used by the business logic computer 104 to determine suggestions for improvements. The business logic computer 104 can, for example, identify areas of weaknesses by identifying certain criteria used in determining the performance score in which the participant's performance data is below the group average. For example, the computer 104 may determine that the participant's participation level is below the group average or that the participant tends to exhibit heavy braking when driving. Accordingly, the business logic computer 104 may determine that if the participant were to improve its level of participation by a certain amount or by improving his/her braking behavior, the participant would qualify for the next tier, tier 3. The application servers 106 or a web server of the system 102 deliver the determined suggestions to the participant's web browser, which can then depict the appropriate graphics and/or texts representative of such improvement suggestions.

Figure 10:
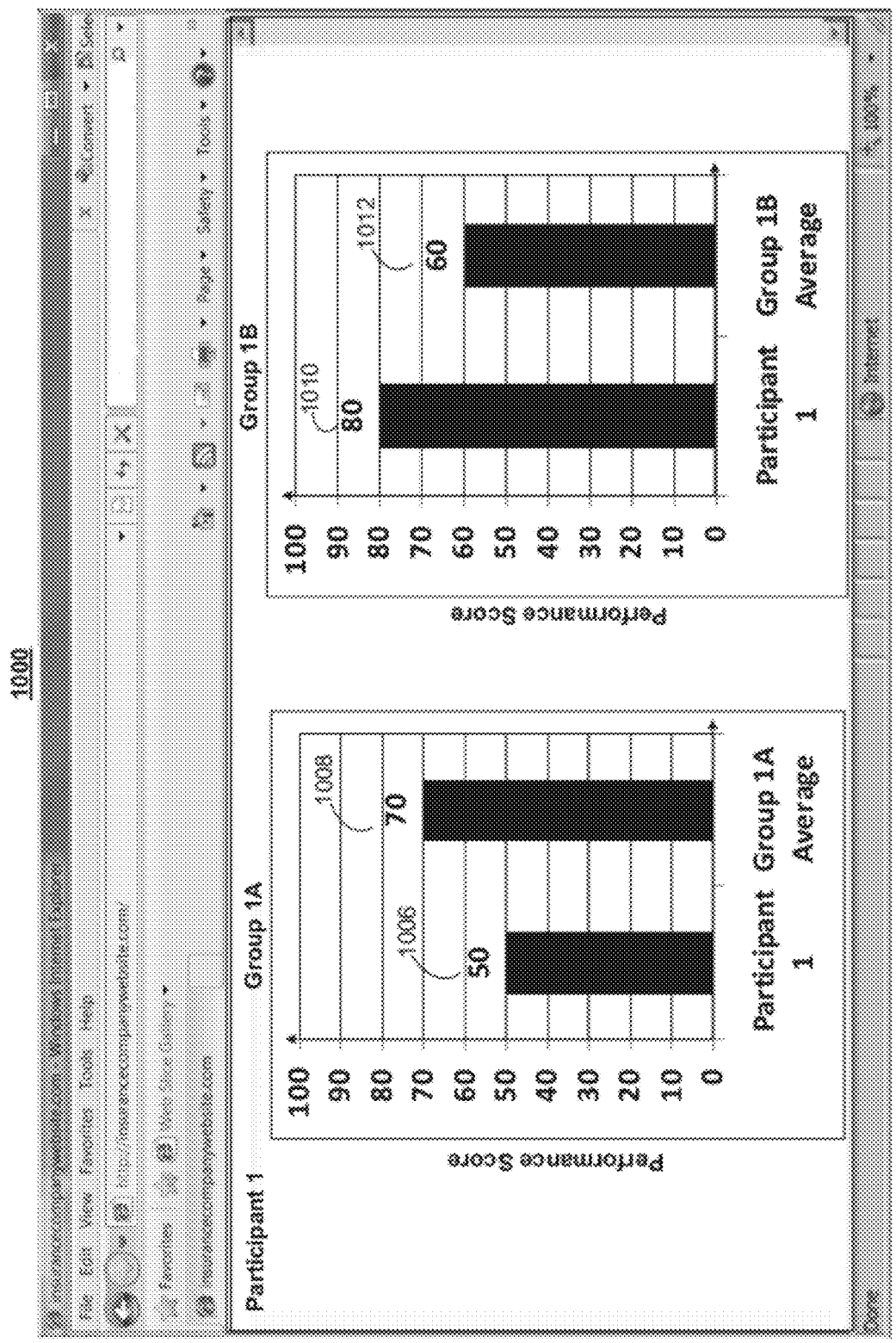
FIG. 10 is a diagram of another graphical user interface for depicting participant's dividend group performance score in two dividend groups in relation to the average score of each group in which the participant is a member, according to an illustrative embodiment of the invention.

FIG. 10 is a diagram of another graphical user interface, in this case, a web page 1000, for depicting participant's dividend group performance score in two dividend groups in relation to the average score of each group in which the participant is a member, according to an illustrative embodiment of the invention. On the web page 1000, the system 102 depicts two bar graphs 1002 and 1004 indicative of the participant's performance as compared to the average performance of both dividend groups that the participant belongs to. The graph 1002, which is associated with the participant's performance in dividend Group 1A, includes two bars. Bar 1006 is indicative of the performance score of the participant and Bar 1008 is indicative of the average performance score of Group 1A. Numerical estimates of performance scores are also depicted on top of the bars 1006 and 1008. Similarly, the graph 1004 is associated with John's performance in dividend Group 1B. The graph 1004 includes bars 1010 and 1012, which are associated with the participant's individual performance score and the average performance score of Group 1B, respectively.

In this illustrative embodiment, the participant lags behind the group average in his performance in dividend Group 1A because he only achieved a score of 50 while the group average is 70. In response to seeing such a difference between his performance score and the group average, the participant may decide to request detailed information about his performance data used for determining the performance score. To do so, the participant can mouse over or click on the bar 1006. In response to receiving the mouse over or click, the appropriate script functions that correspond to such a user interaction are called and a request is sent to the system 102 from the participant's web browser. Accordingly, the system 102 determines and outputs data corresponding to additional details about his performance data, as described above in relation to FIG. 9.

Figure 11:
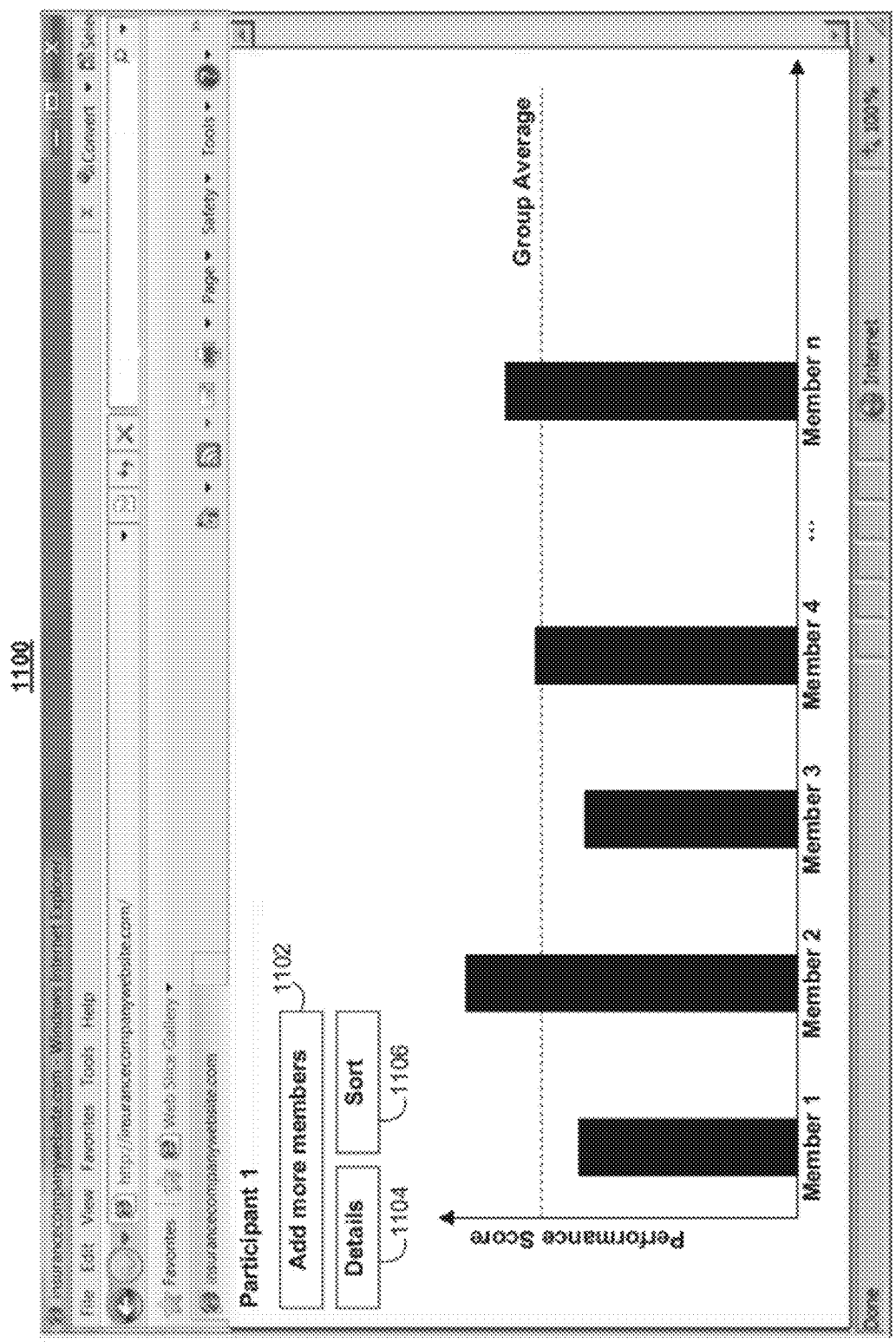
FIG. 11 is a diagram of a further graphical user interface, in this instance, a web page 1100, for depicting the relative performance scores of selected members of a dividend group as compared to the average score of the group, according to an illustrative embodiment of the invention.

FIG. 11 is a diagram of a further graphical user interface, in this instance, a web page 1100, for depicting the relative performance scores of selected members of a dividend group as compared to the average score of the group, according to an illustrative embodiment of the invention. Bar graphs are depicted on the web page 1100, where the height of each bar graph corresponds to the performance score of a member of a dividend group. The dashed line across the center of the web page 1100 indicates the average performance score of the group.

In some embodiments, bar graphs of all members of a dividend group are depicted on the web page 1100. In other embodiments, a participant selects members for whom performance scores may be depicted on the web page 1100. The participant can request bar graphs corresponding to performance scores of additional members to be depicted by clicking on the option 1102. The participant can request additional details of these members' performance, such as a break-down of their scores, by clicking on the "details" button 1104. The participant can also sort the performance scores of the selected members by clicking on the "sort" option 1106. The system 102 can sort these performance scores in an increasing or decreasing order and depict their associated bar graphs in that order. If a vehicle telematics monitoring system is implemented as part of the group dividend plan, the bar graphs as depicted on web page 1100 may correspond to each driver's safety score.

Having such a sorting option as part of the peer tracking application is advantageous as it provides participants, or users of the system 102, an intuitive depiction of their performance relative to other members' performance. Since the overall group performance at least partially determines each participant's dividend at the end of the insurance term, it is valuable to have a feature that allows each member of a dividend group to monitor other members' performance and to encourage one another other to improve their individual performance, thereby contributing to the overall improvement of the group score. Additionally, since the insurance company may offer extra rewards, e.g., concert tickets, to the highest-performing individuals in each dividend group, every member of a dividend group is additionally enticed to improve their performances as doing so would increase their chances of obtaining the rewards.

Figure 12:
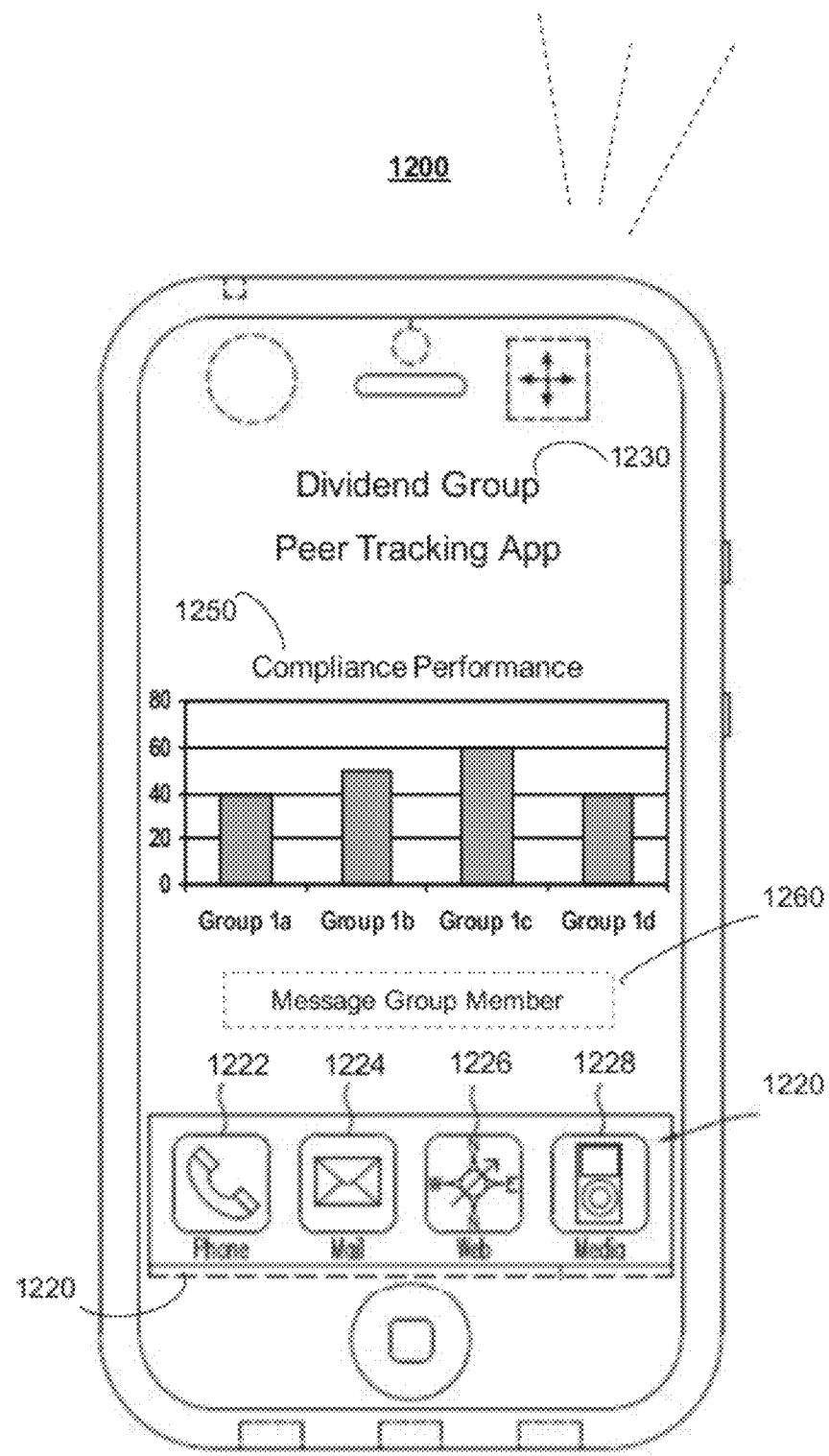
FIG. 12 is a diagram of a mobile device for executing an application for presenting group dividend performance data, according to one illustrative embodiment of the invention.

In some embodiments, the application servers 104 offers various mobile device applications that a participant can download into their mobile device for allowing participants to view their own performance data, the performance data of other members of their dividend group (individually or collectively) and/or the performance data of other dividend groups. Reference is now made to FIG. 12, where such a mobile device 1200 is shown. As shown, the mobile device 1200 can launch (and operate under the control of) one or more application programs by selecting an icon associated with an application program. As depicted, the mobile device 1200 has several primary application programs 1220 including a phone application (launched by selecting icon 1222), an email program (launched by selecting icon 1224), a Web browser application (launched by selecting icon 1226), and a media player application (launched by selecting icon 1228). Those skilled in the art will recognize that mobile device 1200 may have a number of additional different icons and applications, and that applications may be launched in other manners as well. In the embodiment shown, an application, such as a dividend group peer tracking application 1230, is launched by the user tapping or touching an icon displayed on the touch screen 1240 interface of the mobile device 1200.

Once dividend group peer tracking application 1230 is launched, the user may interact with dividend group peer tracking application 1230, and mobile device 1200 may function pursuant to the program instructions associated with the application. During operation, mobile device 1200 is in communication with remote systems including for example, an insurance company, a loss control administrator and/or other entity to allow a user to view and track the relative performance of the dividend group via one or more graphical depictions 1250. Graphical depictions 1250 may provide information indicating the relative performance of individuals within a group or between two or more dividend groups. Group peer tracking application 1230 may also provide the ability to message dividend group members individually or as a group via messaging icon 1260 in order to encourage or comment on another peer member's performance as indicated via graphical depiction 1250. Allowing a user to communicate with another user about his performance though the messaging functionality encourages participants to perform to a higher standard. Communications may also be initiated via phone application icon 1222, email program icon 1224, and Web browser application icon 1226.

The application can also be made available to individuals who are not customers or participants of a dividend plan to allow them to witness the on-going progress of current participants. This enables a supervisor to provide guidance and or encouragement to participants. For example, in the high school example, a high school staff member may be given access to its students driving scores to customize driving safety programs and or to give individualized counseling to unsafe drivers.

In other embodiments, the insurance company can offer various incentives to encourage more individuals to participate in a dividend plan. For groups that achieve the highest loss prevention program performance, they will be given additional rewards in the form of raffle tickets, or donation to their favorite charity organization, and so on. For example, in the school competition scenario, in addition to members of the highest performing school obtaining higher dividends, the insurance company may also donate resources to their school. To help attract potential customers, the insurance company can offer a social network service or application to entities, such as schools, neighborhood associations, or a town, contingent upon these entities' participation in a group dividend plan for which the participants will need to implement loss prevention measures to reduce their insured risks. For each dividend group, their associated social network can publish content related to their and/or others' loss prevention performance.

The invention may be embodied in other specific forms without departing from the spirit or essential characteristics thereof. For example, while the embodiments described in relation to FIGS. 4, and 9-12 are described primarily in relation to web- or browser-based user interfaces, the systems and methods described above can also be implemented in accordance with other commonly known thin or thick client-server models with stand alone software installed on a customer's computing device. Therefore, the foregoing embodiments are to be considered in all respects illustrative, rather than limiting of the invention.

What is claimed is:

1. A system configured to provide a dividend to an insurance customer by an insurance company in relation to an insurance policy issued by the insurance company, the system comprising:
   a data storage device storing a database configured to store data regarding a plurality of insurance group dividend plans, including, with respect to each plan, eligibility criteria to be a member of the plan, a group of customers assigned to the plan, and premium payments and safety data associated with each customer of the group of customers assigned to the plan; and
   a business logic computer processor configured to:
      receive eligibility data related to a customer's eligibility to be assigned to a group dividend plan;
      identify a dividend group plan that a customer is eligible to join based on the received data and the eligibility criteria stored in the database;
      assign the customer to the identified dividend group plan;
      assign the customer to one of a plurality of tiers within the customer's assigned group dividend plan;
      identify a dividend percentage of the customer based on the tier to which the customer is assigned, and
      calculate a dividend to provide to the customer based on the dividend plan to which the customer is assigned and the safety data stored in the database related to the customer, and wherein calculating the dividend comprises multiplying an eligible premium amount associated with the customer by the identified dividend percentage.

2. The system of claim 1, wherein the business logic computer is further configured to, while the customer is participating in the identified dividend group plan:
   obtain a performance score for the customer, and
   output the obtained performance score of the customer to a graphical user interface associated with the customer for depicting a graphical representation of the customer's current dividend plan performance.

3. The system of claim 2, wherein the business logic computer is further configured to:
   obtain performance scores of other customers assigned to the identified dividend plan; and
   output the obtained performance scores to the graphical user interface associated with the customer for depicting a graphical representation of the customer's performance score in relation to other customers' performance scores.

4. The system of claim 2, wherein the depicted graphical representation is indicative of the customer's performance score relative to an average performance score of multiple customers assigned to a dividend group plan.

5. The system of claim 2, wherein the performance score is a driver's safety score indicative of the customer's driving safety, and the driver's safety score is associated with a driving monitoring system implemented as part of the participation in the dividend group plan.

6. The system of claim 1, wherein the safety data comprises data related to the output of sensors monitoring property covered by the insurance policy, the safety data being indicative of the performance of the customer in one or more loss prevention programs; and wherein the business logic processor assigns the customer to the one of a plurality of tiers based on the performance data.

7. The system of claim 1, wherein the safety data comprises data indicative of a participation level of the customer in a prevention program, and wherein the business logic processor assigns the customer to the one of a plurality of tiers based on the participation level data.

8. The system of claim 1, wherein the business logic processor is configured to calculate the dividend based on a loss ratio associated with the group that corresponds to the group dividend plan to which the customer is assigned.

9. The system of claim 1, wherein the eligibility criteria for membership in at least one group dividend plan requires a customer to participate in a corresponding loss prevention program.

10. The system of claim 1, wherein the eligibility criteria for membership in at least one group dividend plan requires a customer to implement a telematics system as part of a loss prevention program.

11. The system of claim 1, wherein the eligibility criteria for membership in at least one group dividend plan requires membership in an affinity group.

12. A computerized method of providing a dividend to an insurance customer by an insurance company in relation to an insurance policy issued by the insurance company, the method comprising:
   storing data in a database regarding a plurality of insurance group dividend plans, including, each plan, eligibility criteria to be a member of the plan, a group of customers assigned to the plan, and premium payments and safety data associated with each customer of the group of customers assigned to the plan;

receiving by a computer eligibility data related to a customer's eligibility to be assigned to a group dividend plan;

identifying by the computer a dividend group plan that a customer is eligible to join based on the received data and the eligibility criteria stored in the database;

assigning by the computer the customer to the identified dividend group plan;

assigning the customer to one of a plurality of tiers within the customer's assigned group dividend plan;

identifying a dividend percentage of the customer based on the tier to which the customer is assigned; and calculating by the computer a dividend to provide to the customer based on the dividend plan to which the customer is assigned and the safety data stored in the database related to the customer, and wherein calculating the dividend comprises multiplying an eligible premium amount associated with the customer by the identified dividend percentage.

13. The computerized method of claim 12, further comprising:

while the customer is participating in the identified dividend group plan, obtaining by the computer a performance score for the customer; and outputting by the computer the obtained performance score of the customer to a graphical user interface associated with the customer for depicting a graphical representation of the customer's current dividend plan performance.

14. The computerized method of claim 13, further comprising:

obtaining by the computer performance scores of other customers assigned to the identified dividend plan; and outputting by the computer the obtained performance scores to the graphical user interface associated with the customer for depicting a graphical representation of the customer's performance score in relation to other customers' performance scores.

15. The computerized method of claim 13, wherein the depicted graphical representation is indicative of the customer's performance score relative to an average performance score of multiple customers assigned to a dividend group plan.

16. The computerized method of claim 13, wherein the performance score is a driver's safety score indicative of the customer's driving safety, and the driver's safety score is associated with a driving monitoring system implemented as part of the participation in the dividend group plan.

17. The computerized method of claim 12, wherein the safety data comprises data related to the output of sensors monitoring property covered by the insurance policy, the safety data being indicative of the performance of the customer in one or more loss prevention programs; and wherein the method further comprises assigning by the computer the customer to the one of a plurality of tiers based on the performance data.

18. The computerized method of claim 12, wherein the safety data comprises data indicative of a participation level of the customer in a prevention program, and wherein the method further comprises assigning by the computer the customer to the one of a plurality of tiers based on the participation level data.

19. A non-transitory computer readable medium storing computer executable instructions, which, when executed by a processor, cause the processor to carry out a method comprising:

storing in a database data regarding a plurality of insurance group dividend plans, including, with respect to each plan, eligibility criteria to be a member of the plan, a group of customers assigned to the plan, and premium payments and safety data associated with each customer of the group of customers assigned to the plan;

receiving eligibility data related to a customer's eligibility to be assigned to a group dividend plan;

identifying a dividend group plan that a customer is eligible to join based on the received data and the eligibility criteria stored in the database;

assigning the customer to the identified dividend group plan;

assigning the customer to one of a plurality of tiers within the customer's assigned group dividend plan;

identifying a dividend percentage of the customer based on the tier to which the customer is assigned; and calculating a dividend to provide to the customer based on the dividend plan to which the customer is assigned and the safety data stored in the database related to the customer, and wherein calculating the dividend comprises multiplying an eligible premium amount associated with the customer by the identified dividend percentage.

20. The non-transitory computer readable medium of claim 19, wherein the method further comprises:

while the customer is participating in the identified dividend group plan, obtaining a performance score for the customer; and outputting the obtained performance score of the customer to a graphical user interface associated with the customer for depicting a graphical representation of the customer's current dividend plan performance.

21. The non-transitory computer readable medium of claim 20, wherein the method further comprises:

obtaining performance scores of other customers assigned to the identified dividend plan; and outputting the obtained performance scores to the graphical user interface associated with the customer for depicting a graphical representation of the customer's performance score in relation to other customers' performance scores.

22. The non-transitory computer readable medium of claim 20, wherein the depicted graphical representation is indicative of the customer's performance score relative to an average performance score of multiple customers assigned to a dividend group plan.

23. The non-transitory computer readable medium of claim 20, wherein the performance score is a driver's safety score indicative of the customer's driving safety, and the driver's safety score is associated with a driving monitoring system implemented as part of the participation in the dividend group plan.

24. The non-transitory computer readable medium of claim 20, wherein the safety data comprises data indicative of a participation level of the customer in a prevention program, and wherein the method further comprises assigning the customer to the one of a plurality of tiers based on the participation level data.

25. The non-transitory computer readable medium of claim 19, wherein the safety data comprises data related to the output of sensors monitoring property covered by the insurance policy, the safety data being indicative of the performance of the customer in one or more loss prevention programs; and wherein the method further comprises assigning the customer to the one of a plurality of tiers based on the performance data.

* * * * *